United States Patent
Zhang et al.

(10) Patent No.: US 11,032,002 B2
(45) Date of Patent: Jun. 8, 2021

(54) SIGNAL PROCESSING SYSTEM APPLIED TO REMOVE OTDR NOISE

(71) Applicant: Accelink Technologies Co., Ltd., Hubei (CN)

(72) Inventors: Peng Zhang, Hubei (CN); Jiantao Zhang, Hubei (CN); Cuihong Zhang, Hubei (CN)

(73) Assignee: Accelink Technologies Co., Ltd.

( * ) Notice: Subject to any disclaimer, the term of this patent is extended or adjusted under 35 U.S.C. 154(b) by 0 days.

(21) Appl. No.: 16/756,752

(22) PCT Filed: Dec. 25, 2017

(86) PCT No.: PCT/CN2017/118173
§ 371 (c)(1),
(2) Date: Apr. 16, 2020

(87) PCT Pub. No.: WO2019/075913
PCT Pub. Date: Apr. 25, 2019

(65) Prior Publication Data
US 2021/0083767 A1 Mar. 18, 2021

(30) Foreign Application Priority Data
Oct. 18, 2017 (CN) .......................... 201710967905.X

(51) Int. Cl.
*H04B 10/071* (2013.01)
*H04B 10/50* (2013.01)
(Continued)

(52) U.S. Cl.
CPC ..... *H04B 10/071* (2013.01); *H04B 10/07953* (2013.01); *H04B 10/503* (2013.01); *H04B 10/697* (2013.01)

(58) Field of Classification Search
None
See application file for complete search history.

(56) References Cited

U.S. PATENT DOCUMENTS

| 2008/0002971 A1* | 1/2008 | Genay ............... G01M 11/319 398/17 |
| 2008/0106731 A1 | 5/2008 | Iwasaki |
| 2017/0033863 A1* | 2/2017 | Zhou .................... H04B 10/071 |

FOREIGN PATENT DOCUMENTS

| CN | 101839698 A | 9/2010 |
| CN | 103196465 A | 7/2013 |
| CN | 107743048 A | 2/2018 |

OTHER PUBLICATIONS

Martins "Coherent Noise Reduction in High Visibility Phase-Sensitive Optical Time Domain Reflectometer for Distributed Sensing of Ultrasonic Waves" Journal of Lightwave Technology, vol. 31, No. 23, Dec. 1, 2013, pp. 3631-3637 (Year: 2013).*

(Continued)

*Primary Examiner* — Darren E Wolf
(74) *Attorney, Agent, or Firm* — Lerner, David, Littenberg, Krumholz & Mentlik, LLP

(57) ABSTRACT

The present disclosure relates to a signal processing system applied to remove OTDR noise, comprising: an analog-to-digital converter, a laser and driving unit, a sequence accumulator, a preprocessing counter, a pulse generator, a dual-port memory, a self-adaptive filter, an event decision device, and a preprocessing data decision device. The self-adaptive filter reads preprocessing data from a read-only port of the dual-port memory, and performs noise processing on the read preprocessing data by using a self-adaptive filtering method of wavelet transform. The event decision device performs an event decision on the filtered data output from the self-adaptive filter; The preprocessing data decision device decides whether a certain set of preprocessing data in m groups of preprocessing data is correct data or high-signal-to-noise data according to the difference of the m groups of preprocessing data after passing through the event decision device.

17 Claims, 8 Drawing Sheets

(51) Int. Cl.
*H04B 10/69* (2013.01)
*H04B 10/079* (2013.01)

(56) References Cited

OTHER PUBLICATIONS

Kobayashi "Polarization-Independent Interferometric Optical-Time-Domain Reflectometer" Journal of Lightwave Technology. vol. 9, No. 5, May 1991 pp. 623-628 (Year: 1991).*
International Search Report from Application No. PCT/CN2017/118173 dated Jul. 6, 2018, 2 pages.

* cited by examiner

SIGNAL PROCESSING SYSTEM APPLIED TO REMOVE OTDR NOISE

CROSS-REFERENCE TO RELATED APPLICATIONS

The present application is a national phase entry under 35 U.S.C § 371 of International Application No. PCT/CN2017/118173 filed Dec. 25, 2017, which claims priority from Chinese Application No. 201710967905.X filed Oct. 18, 2017, all of which are hereby incorporated herein by reference.

TECHNICAL FIELD OF THE DISCLOSURE

The present disclosure relates to a signal processing system, in particular to a signal processing system applied to remove noise of an OTDR, and is particularly suitable for removing non-stationary noise of the OTDR.

BACKGROUND

Conventionally, a structure of an optical time domain reflectometer (OTDR) is shown in FIG. 1, and a classic description of working process of the OTDR is as follows: during each test, a microprocessor sends a command to a pulse generator which in turn emits an electric pulse, and the laser is controlled by the electric pulse to generate an optical pulse with a very narrow width, which is injected into an optical fiber to be tested through a fiber coupler and propagates in the optical fiber, in addition a backscattered light along each point of the optical fiber returns to an injection end of the optical fiber and then reflects to an optical receiver through the optical fiber coupler. The function of the optical receiver is opposite to that of the laser. The optical receiver converts the optical signal into an analog electrical signal. The analog electrical signal is amplified and transmitted to A/D, then is converted into a digital signal by A/D sampling and is read in by the microprocessor. The microprocessor outputs the read-in signal to the liquid crystal display after being processed by digital filtering, averaging and other methods, and then the measured result can be observed and recorded. Moreover, the physical quantities such as a position of a fault point, a position of an optical fiber joint or loss point, and a length of an optical fiber are obtained by calculating the read-in waveform.

From the above process, it can be seen that the backscattered light from each point of the optical fiber at any time accumulatively passes through the fiber coupler and becomes power of the optical receiver at that time, and the main component thereof is a reflection of a certain position of the corresponding optical fiber link on the pulse corresponding scattering effect. In order to obtain the measurement capability of a longer-distance optical fiber, the sensitivity of a receiving circuit is required to be higher to obtain a larger dynamic range. The dynamic range of the OTDR is defined as the difference between an initial backscattered light signal energy and a level dropped to a specific noise level, which is expressed in dB. The high-sensitivity receiving circuit is more vulnerable to suffer interference from various types of noise. A stationary noise source can be better suppressed by using conventional filters such as FIR, wavelet transform, and the like. However, for OTDR applications, noise has something special. In order to improve a signal-to-noise ratio, it is generally used to send the optical pulses a few times and accumulate the returned optical signal sequence a few times, calculate an arithmetic average to obtain a waveform with a higher signal-to-noise ratio, and then perform applications such as filtering or event extraction calculation, and the like. In general, the time taken for each measurement varies from 5 seconds to 50 seconds depending on the application. In principle, the longer the time it takes, the higher the obtained waveform signal-to-noise ratio is.

A typical OTDR signal processing timing is shown in FIG. 2. In order to facilitate subsequent expression, a symbol SER is used to indicate a corresponding digital signal receiving sequence after one optical pulse is emitted. A total sequence number q indicates that a pulse is emitted q times for each OTDR measurement, the signal-to-noise ratio is improved by arithmetic average of all results. A symbol #is used to indicate an addition of two data sequences, for example, a result sequence obtained by SER1 #SER2 is obtained by successively adding data of each position in the sequence SER1 and data of a corresponding position in SER2. In FIG. 2, after a pulse a is emitted, the data sequence SER1 is obtained by data receiving series; after a pulse b is emitted, an accumulator obtains the result SER1, and the data sequence SER2 is obtained by data receiving series; after a pulse c is emitted, the accumulator obtains the result SER1 #SER2, and a data sequence SER3 is obtained by data receiving series; after a pulse d is emitted, the accumulator obtains a result SER1 #SER2 #SER3, and a data sequence SER4 is obtained by data receiving series, and so on; in a similar manner, after all q pulses are emitted, the accumulator obtains a result SER1 #SER2 #SER3 # . . . #SER(q−1), and the data sequence SERq is obtained by data receiving series, then in a next clock cycle, no pulse will be emitted and the accumulator obtains a result SER1 #SER2 #SER3 # . . . #SER(q−1) #SERq. It is easily noticed that the OTDR is an application that obtains a high signal-to-noise ratio through repeated measurements and takes a long measurement time, accordingly, for the interference of non-stationary noise sources, such as an instantaneous impact, a short-term temperature change, or even an occasional device failure or an abnormal operation, and the like, a targeted treatment is not performed.

In addition, as shown in FIG. 3, in order to obtain a large dynamic range of a returned optical signal sequence while ensuring detection linearity, an existing conventional method is to use a linear circuit of a shift structure. The circuit structure on the right portion of FIG. 3 shows that when working, according to the difference of the required detection range, measurements of different magnifications are obtained by turning on only K1 (i.e. path), only K2 (i.e. path), and only K3 (i.e. path), so as to ensure the large-dynamic-range measurement. Corresponding to a test curve of the OTDR actually obtained on the left side of FIG. 3, a first-stage portion of an amplifier is marked as a measurement result on K1 path, a second-stage portion of the amplifier is marked as a measurement result on K2 path, and a third-stage portion of the amplifier is marked as a measurement result on K3 path. Since circuits of different stages have different frequency response ranges in essence, the inherent noises thereof are also different, which is also a typical non-stationary noise source.

SUMMARY

The object of the present disclosure is to overcome the problems and deficiencies existing in the prior art, and to provide a method being capable of processing noise in an OTDR, especially non-stationary noise. The present disclosure uses a method which combines a wavelet-based self-adaptive filtering process and a time piecewise measurement while discarding invalid data. In particular, a self-adaptive filter is used to reduce noise of different electrical amplifiers, and a time piecewise measurement process is used to reduce noise introduced by short-time interference. The combination of the self-adaptive filter and the time piecewise measurement can better improve the signal-to-noise ratio of the OTDR and provide strong support for accurately calculating attenuation parameters, event distances, obtaining smooth visual waveforms, etc.

The present disclosure provides a signal processing system applied to remove OTDR noise, comprising an analog-to-digital converter, a laser and driving unit, a sequence accumulator, a preprocessing counter, a pulse generator, a dual-port memory, a self-adaptive filter, an event decision device, and a preprocessing data decision device;

wherein the pulse generator includes a digital circuit for generating an electric pulse which corresponds to an optical pulse required by an OTDR measurement, and q electric pulses are generated during one OTDR measurement;

wherein the laser and driving unit are used to convert the electric pulse generated by the pulse generator into the optical pulse signal without distortion;

wherein the analog-to-digital converter is used to convert an analog electrical signal indicating an OTDR test result into a digital signal to form a measurement sequence SERi which indicates a measurement sequence SER obtained by an i-th optical pulse;

wherein the sequence accumulator is used to accumulate and preprocess every n received measurement sequence SERs to obtain a group of preprocessing data, thus m groups of preprocessing data are obtained during one OTDR measurement, m*n=q;

wherein one port of the dual-port memory is a write-only port which is connected to the sequence accumulator and through which each group of preprocessing data obtained is written by the sequence accumulator, and the other port of the dual-port memory is a read-only port which is used to take data away for subsequent noise processing;

wherein the preprocessing counter is used to count a number of groups of preprocessing data obtained by the sequence accumulator, and generate an interrupt signal to notify the self-adaptive filter to read a new group of preprocessing data from the read-only port of the dual-port memory when a group of preprocessing data is obtained;

wherein the self-adaptive filter reads the preprocessing data from the read-only port of the dual-port memory, and performs noise processing on the read preprocessing data by using a self-adaptive filtering process based on wavelet transform;

wherein the event decision device performs an event decision on filtered data output from the self-adaptive filter;

wherein the preprocessing data decision device decides whether a certain group of preprocessing data in m groups of preprocessing data is correct data or high signal-to-noise data according to a difference of the m groups of preprocessing data after passing through the event decision device.

In the above technical solution, the sequence accumulator further performs an arithmetic average calculation after accumulating every n measurement sequence SERs.

In the above technical solution, by using a multi-resolution frame, the self-adaptive filter performs wavelet decomposition on an original signal X to obtain cD1, cD2, cD3, cA3, wherein cD1 indicates a highest frequency portion, cA3 indicates a lowest frequency portion; then, a sequence of cD1 is taken an absolute value to obtain a sequence abs (cD1) and then is sorted; a noise recovery threshold is taken as a minimum value in largest beta values in the sorted sequence, a number of absolute value in cD1 that is greater than the noise recovery threshold is set as a noise average value, finally, wavelet reconstruction is performed with cD2, cD3, cA3 and updated cD1, to obtain a signal sequence after noise reduction.

In the above technical solution, the preprocessing data decision device adopts an index evaluation function:

$$EVLij = \begin{cases} \frac{abs(Pij - averPi)}{stdPi} & \text{if } (abs(Pij - averPi)/stdPi) < 1 \\ 1 & \text{else} \end{cases}$$

where EVLij indicates an evaluation of an i-th parameter of a preprocessing sequence j, Pij indicates a value of the i-th parameter of the preprocessing sequence j, abs function indicates a calculation for absolute value, aver indicates a calculation for arithmetic average, averPi indicates an arithmetic average of the i-th parameter in all m groups of sequences, stdPi is an accuracy measurement standard quantity of the i-th parameter;

an overall evaluation function: abs (EVLj−averEVL)<r*ratio where * indicates a multiplication calculation, ratio indicates an average deviation rate, EVLj is used to indicate an overall evaluation of j-th sequence, and averEVL is used to indicate an average value of the overall evaluation of all M groups of sequences;

to obtain a sum of all evaluation values of 1 to r event parameters of the preprocessing sequence j, wherein in m sequences, a sequence represents a sequence with a high signal-to-noise ratio if its value of the evaluation function obtained by the calculation is 1.

In the above technical solution, the pulse generator, the sequence accumulator, the preprocessing counter, and the dual-port memory are implemented by a PLD device.

In the above technical solution, the self-adaptive filter, the event decision device, and the preprocessing data decision device are implemented by a DSP and/or a CPU.

In the above technical solution, the PLD device is an FPGA or a CPLD.

The present disclosure achieves following technical effects:

The present disclosure uses a mixed structure of the PLD device and the DSP/MCU device and the advantages of the respective devices are brought into play, wherein the PLD device is responsible for continuous sampling and accumulation calculation, and the processor immediately completes the calculation of the current preprocessing sequence after the interrupt is triggered, so as to ensure that the calculation performance and real-time performance of the system are simultaneously satisfied;

The present disclosure uses an adaptive wavelet transform process to improve the signal-to-noise ratio of the received sampling sequence, and it especially has a good suppression effect for the non-stationary noise source with different frequency response ranges in essence for difference stages of circuits and also different inherent noise;

The present disclosure uses the preprocessing data decision device to distinguish the sequence with low noise and small distortion in the preprocessing data sequences as the valid sequence of the last calculation event, which suppresses the noise from the non-stationary noise source well.

The core calculation unit in the present disclosure is multiplexed after the preprocessing sequence calculation and the final noise-reduced data calculation, which modularizes and standardizes related design, and also saves resource consumption.

DETAILED DESCRIPTION

In order to facilitate understanding and implementation of the present disclosure by those of ordinary skill in the art, the present disclosure will be described in further detail below with reference to the accompanying drawings and detailed description.

Figure 4:
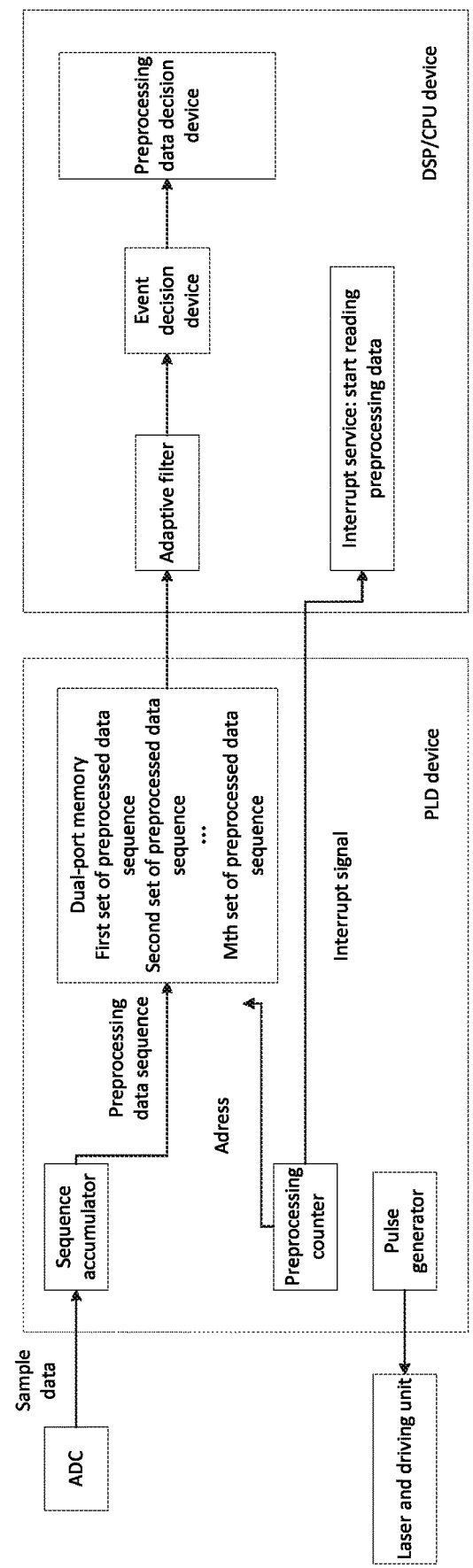
FIG. 4 is a frame diagram of an OTDR digital signal processing system of the present disclosure.

The present disclosure provides a digital signal processing system being capable of processing noise in an OTDR, especially non-stationary noise. FIG. 4 shows its frame diagram. As shown in FIG. 4, the system includes an analog-to-digital converter ADC, a laser and driving unit, a sequence accumulator, a preprocessing counter, a pulse generator, a dual-port memory (i.e. a preprocessing data memory), a self-adaptive filter, an event decision device, a preprocessing data decision device, and an interrupt service routine.

The pulse generator includes a digital circuit for generating an electric pulse, and the generated electric pulse correspond to a required optical pulse with a certain measurement pulse width. The measurement pulse width is usually specified by a user command according to a priori information at the time of application.

The ADC is used to convert an analog electrical signal indicating an OTDR test result into a digital signal. q is used to indicate a total number required for transmitting optical pulses for one measurement, i.e. a total number of pulses received in the sequence for improving the signal-to-noise ratio, and is recommended to be an integer power of 2.

The laser and driving unit are used to convert an electric pulse into an optical pulse signal without distortion.

The sequence accumulator is used to accumulate a received measurement sequence SER after each optical pulse is emitted. For example, after a first pulse is emitted, the sequence accumulator performs a test and saves a value 0 #SER1; after a second pulse is emitted, the sequence accumulator performs a test and saves a value of 0 #SER1 #SER2; after an i-th pulse is emitted, the sequence accumulator performs a test and saves a value of 0 #SER1 #SER2, # . . . #SERi. The sequence accumulator can be implemented by a set of counters, adders, and registers. In the present disclosure, accumulated results of every n pulses are performed arithmetic average and then limited as a set of processed data. Such an arithmetic average process is defined as a preprocessing, i.e. (0 #SER1 #SER2 # . . . #SERn)/n, where n is recommended to be an integer power of 2. If a total of m groups of data need to be preprocessed, then q=m×n, i.e. the product of the two is the total sequence number q.

The dual-port memory is a memory for storing the above m groups of preprocessing data. One port of the dual-port memory is a write-only port, and the accumulator is responsible for writing a calculation result. The other port is a read-only port, which is used to take the data away for subsequent noise processing.

The preprocessing counter is used for counting, and after each preprocessing sequence is updated, on one hand, an interrupt signal is generated to notify reading of a new group of preprocessing data, on the other hand, an address is updated after a delay (i.e. wait until the reading is completed) to provide a correct address for the next writing of the accumulator.

The pulse generator, the sequence accumulator, the preprocessing counter, and the dual-port memory all are usually implemented by a PLD device (usually, a FPGA may be used).

The self-adaptive filter and the event decision device both are usually implemented by using software algorithms in processors such as DSP/CPU.

The self-adaptive filter is an adaptive filtering module using wavelet transform, which reads data from the read-only port of the dual-port memory and performs noise processing by using a self-adaptive filtering process based on wavelet transform.

The event decision device is a typical OTDR event decision device performing an event decision on the filtered data output from the self-adaptive filter, which may usually be obtained by using a time domain analysis process, such as a graphic analysis process or a frequency analysis process, and the like (such as wavelet transform, windowing Fourier transform, and the like). Since such processes are necessary portions for any OTDR product, these processes will not be described in detail here.

The preprocessing data decision device decides whether a certain group of preprocessing data in m groups of preprocessing data is correct data or high signal-to-noise data according to a difference of the m groups of data (a total of q sequences) after passing through the event decision device, and the group of preprocessing data is to be treated differently in a subsequent processing.

The interrupt service unit is used to trigger off the self-adaptive filter to read data from the read-only port of the dual-port memory for noise processing, i.e. to start a subprogram of reading a group of data to be filtered after receiving an interrupt in the processor.

Figure 1:
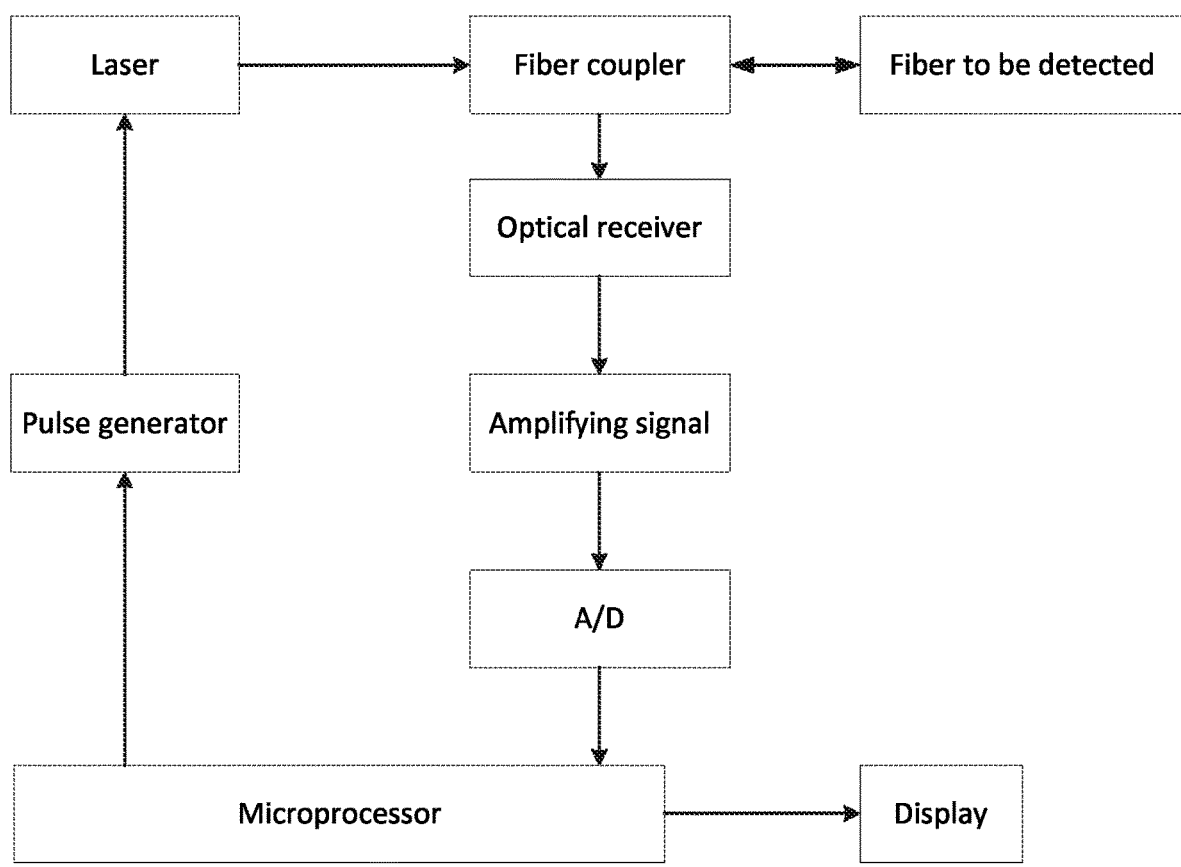
FIG. 1 shows a typical structure of an existing OTDR.
Figure 2:
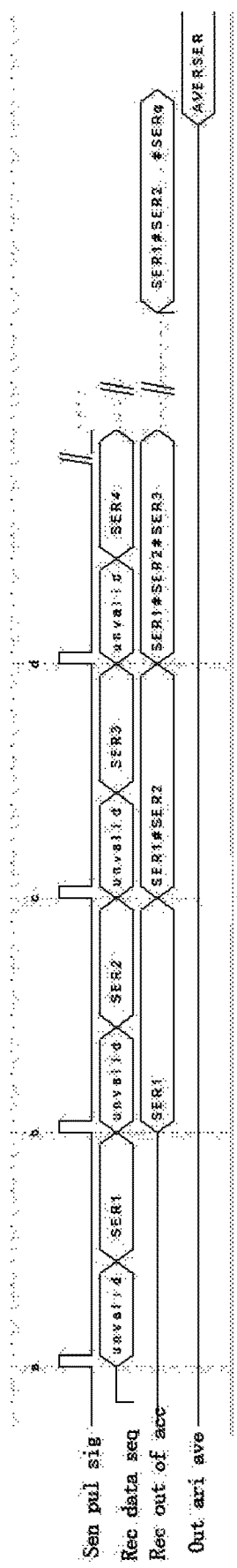
FIG. 2 is a timing diagram of an existing typical OTDR.
Figure 3:
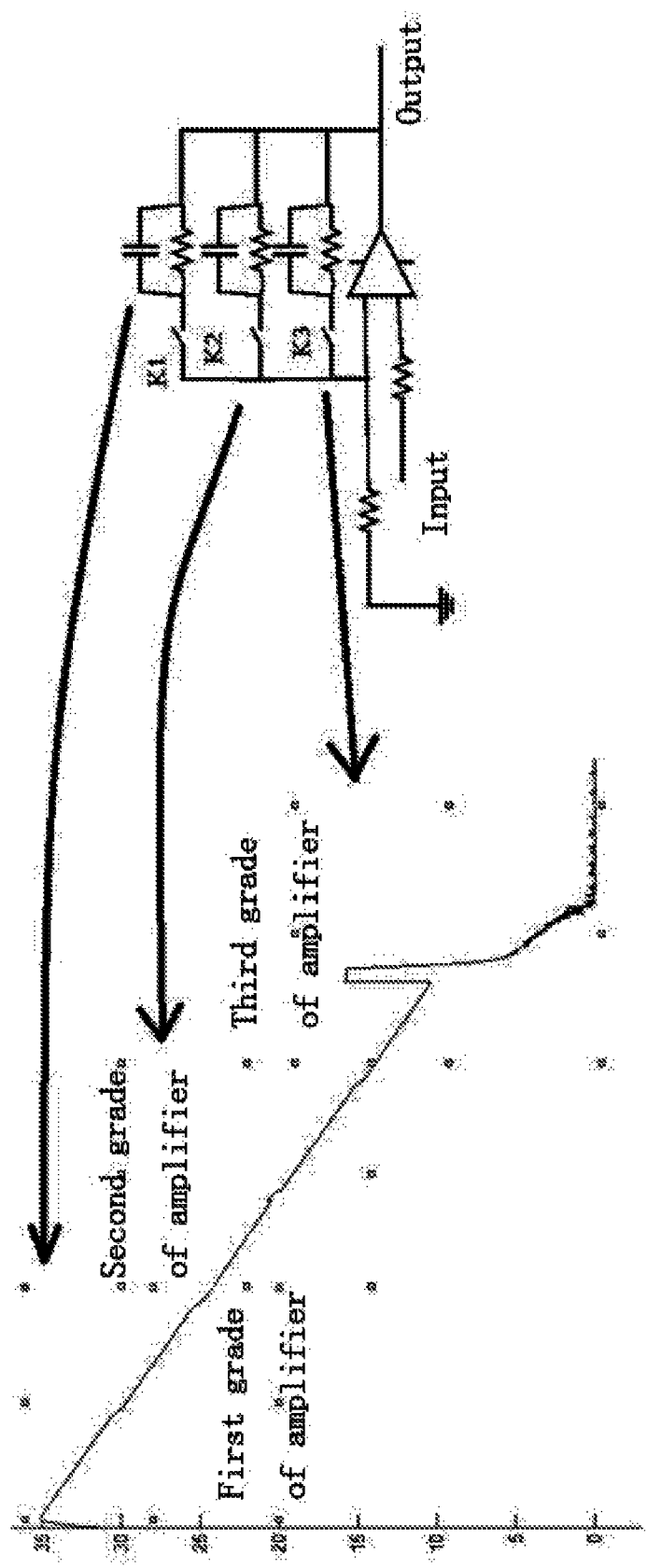
FIG. 3 shows an existing typical OTDR waveform and a corresponding linear detection circuit.
Figure 5:
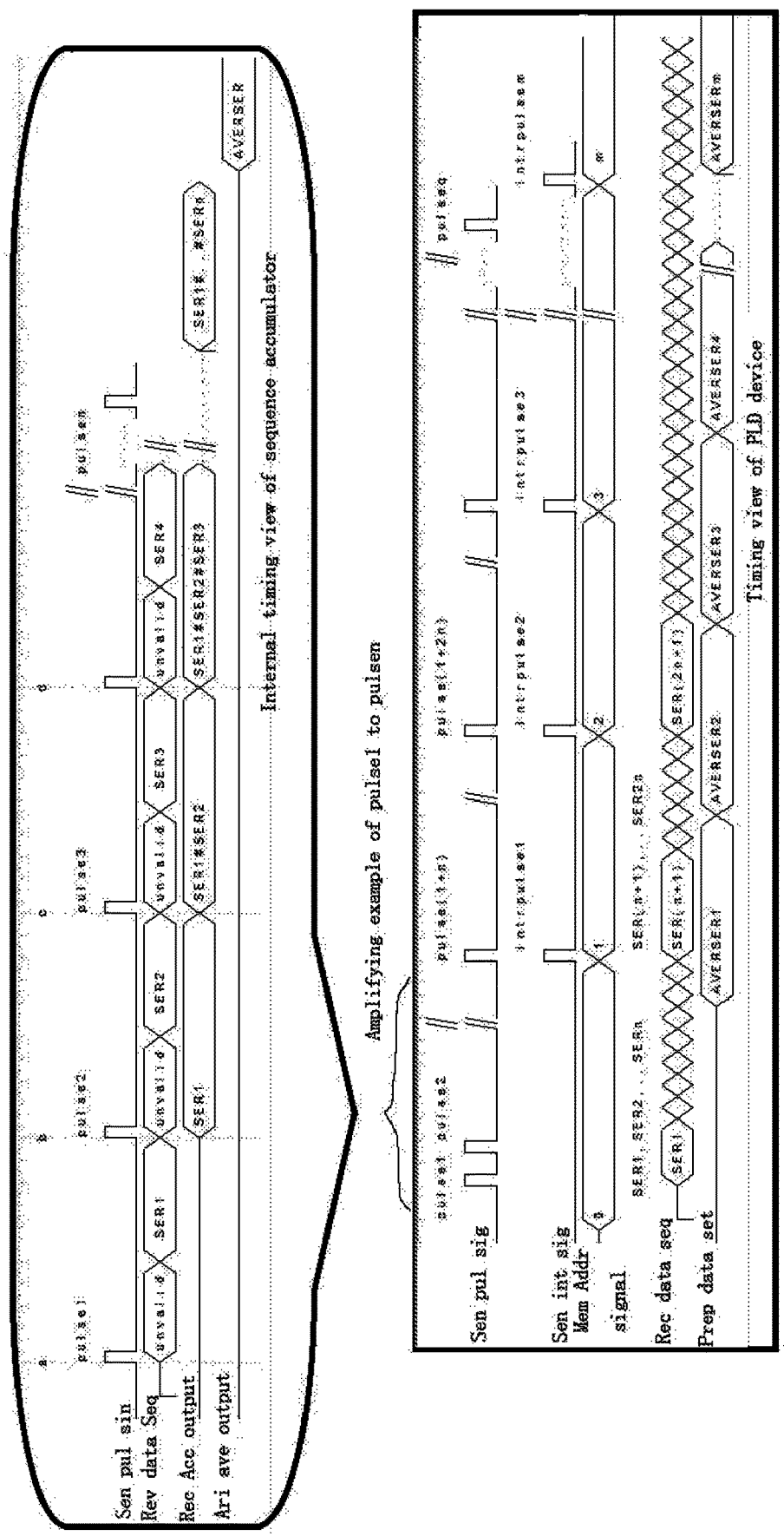
FIG. 5 is a timing diagram of an OTDR PLD device of the present disclosure.

In order to further describe the working principle of internal units of the above PLD device, a timing diagram of FIG. 5 is used for description, and features of the present disclosure can be obtained by comparing a difference between the timing diagram of FIG. 5 and the timing diagram of FIG. 2. FIG. 5 is divided into two portions, i.e. an upper portion and a lower portion. The upper portion is an internal timing diagram of the sequence accumulator, and it can be seen by comparing FIG. 2, after each pulse is emitted, the sequence accumulator is used to accumulate a value of a received data sequence, and the difference from the traditional method is that the traditional method calculates the arithmetic average output of the cumulative sum for all q sequences, while in the present disclosure, an average output of sequences is calculated for every n sequences, there are altogether n sets, and the total number of the sequences is still q under the condition that the test time is constant. In FIG. 5, after a pulse a is emitted, a data sequence SER1 is obtained by receiving data series; after a pulse b is emitted, the sequence accumulator obtains a result SER1, and a data sequence SER2 is obtained by receiving data series; after a pulse c is emitted, the sequence accumulator obtains a result SER1 #SER2, and a data sequence SER3 is obtained by receiving data series; after a pulse d is emitted, the accumulator obtains a result SER1 #SER2 #SER3, and a data sequence SER4 is obtained by receiving data series, and so on, after all n-th pulses in the present group are emitted, the sequence accumulator obtains a result SER1 #SER2 #SER3 # . . . #SER(n−1), and a data sequence SERn is obtained by receiving data series, and in a next clock cycle, the accumulator obtains a result SER1 #SER2 #SER3 # . . . #SER(n−1) #SERn. A lower view in FIG. 5 is an overall timing diagram of the PLD device, and it can be seen from the connection description between the lower view and an upper view of FIG. 5 that a timing in the upper view is a timing processing of the first n data sequence, for the second, third to the m-th, the sequence processing inside the sequence accumulator is similar to the first, until all q pulse signals are emitted, and all m groups of preprocessing data will be calculated and all stored in an internal memory. After every group of preprocessing data is calculated, i.e. after the arithmetic average output AVERSER is obtained in the upper view of FIG. 5, the preprocessing data sequence will be written to the memory, the PLD device sends an interrupt signal to inform the DSP to take out the latest group of preprocessed data sequence. An interrupt pulse intrpulse1 is emitted after the first group of preprocessing data sequence is obtained. An interrupt pulse intrpulse2 is emitted after the second group of preprocessing data sequence is obtained. An interrupt pulse intrpulse3 is emitted after the third group of preprocessing data sequence is obtained . . . . An interrupt pulse intrpulsem is emitted after the m-th group of preprocessing data sequence is obtained. At the same time, the memory address is incremented to prepare for the writing of the next group of data sequences, wherein an address 0 is the address of the first group of preprocessing data sequence, and an address 1 is the address of the second group of preprocessing data sequence, and so on. It should be noted that the address needs to be initialized before each OTDR test. The timing of the preprocessing array is synchronized with the above process, i.e. the first group of preprocessing sequence AVERSER1 is written to an address memory 0, the second group of preprocessing sequence AVERSER2 is written to an address memory 1, the third group of preprocessing sequence AVERSER3 is written to an address memory 2 . . . the m-th group of preprocessing sequence AVERSERm is written to an address memory m−1.

Figure 6:
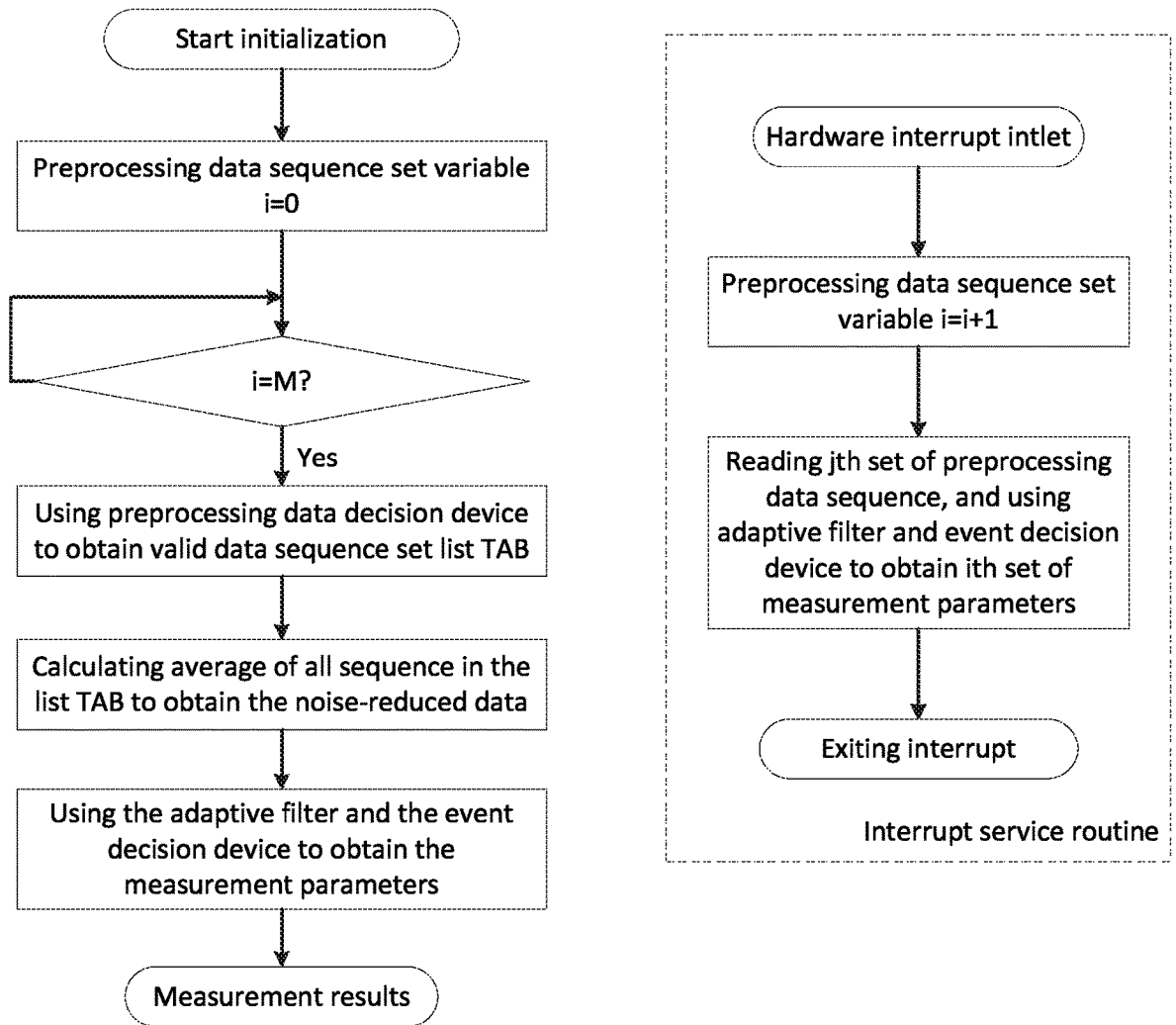
FIG. 6 is a flowchart of a processor of the present disclosure.

In order to further describe the working principle of the internal unit of the processor device, the program flowchart of FIG. 6 is used for description. The interrupt service routine on the right of FIG. 6 is responsible for filtering each group of preprocessing data sequences and calculating event parameters after receiving the interrupt. Since each interrupt trigger indicates that a new group of preprocessing data is ready in the PLD device memory, each interrupt will trigger the processing flow on the left side of FIG. 6 to read the PLD device memory and sequentially perform operations of adaptive filtering and event decision, and then exit the interrupt. A variable of a preprocessing data sequence set indicates an index of the preprocessing data sequence set, and its valid value is between 1 and m. Therefore, in the left view of FIG. 6, it is assigned a value of 0 at the initialization and is performed an increment operation by the interrupt service program at each entry, and after the main program decides that all m groups of preprocessing data sequences are completed, the preprocessing data decision device is used to obtain a valid data sequence set list TAB. The preprocessing data decision device is a unit that decides whether a certain group of the m groups of data is correct data or high signal-to-noise ratio data according to the difference of the m groups of data after passing through the event decision device, in other words, after the processing is completed, the TAB table is an index set of preprocessing data sequences which can meet the measurement standards. For example, if the first preprocessing data sequence cannot meet the signal-to-noise ratio requirements, the content of the TAB table is [2, 3, 4, . . . m], and the table length is m−1, and in a similar manner, if there are k preprocessing data sequences that cannot meet the signal-to-noise ratio requirements, the table length is m-k. Then the main program will take out all the preprocessing data sequences in the TAB table in the PLD to perform sequence addition calculation, and calculate the arithmetic average to obtain the data after noise reduction, and then use the self-adaptive filter and the event decision device again to calculate the noise-reduced data, thus the measurement parameters of this time can be obtained. The measurement process of the OTDR of this time is completed.

Figure 7:
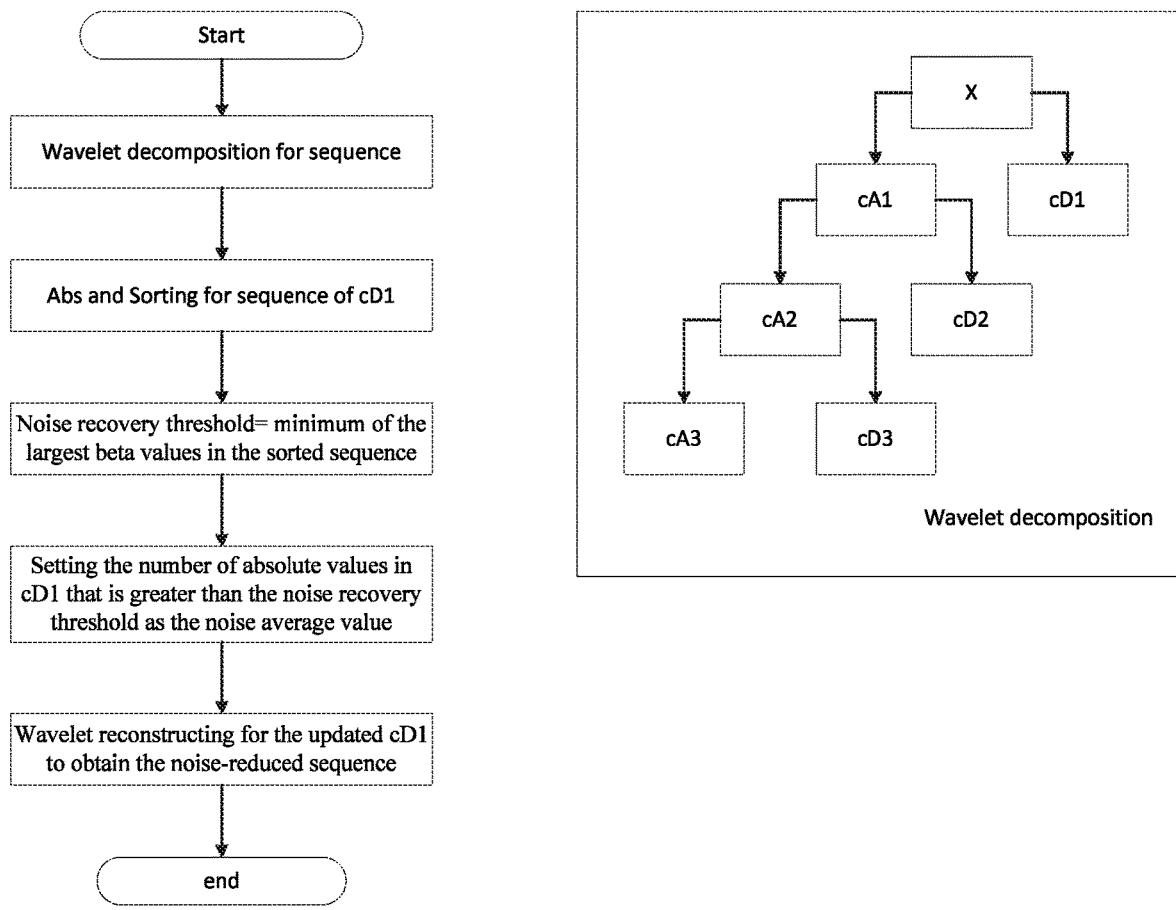
FIG. 7 is a flowchart of a self-adaptive filtering calculation of the present disclosure.

The self-adaptive filter is mainly used to weaken the non-stationary noise introduced due to the inconsistency of amplification characteristics of the circuit, and the calculation process thereof is shown in FIG. 7. Firstly, wavelet decomposition is performed using the multi-resolution frame on the right side of FIG. 7, wherein cD1 indicates the highest frequency portion, cA3 indicates the lowest frequency portion, i.e. the original signal X is decomposed to cD1, cD2, cD3 and cA3. Then, the sequence of cD1 is taken an absolute value and sorted, that is to say, every number in the cD1 is taken its absolute value to obtain the sequence abs (cD1), and then is sorted. A noise recovery threshold is taken as the minimum value of the largest beta values in the sorted sequence, i.e. any value greater than the noise recovery threshold is considered to be a point with too much noise and needs to be processed, and generally, the value of beta is selected as 2% or 3% of the total length of the sequence, i.e. a point at which a high-frequency component is greater than this value in this sequence is considered as an abnormal point, or a point with a poor signal-to-noise ratio. And then, the number of absolute values in cD1 that is greater than the noise recovery threshold is set as the noise average value which is an arithmetic average. Finally, wavelet reconstruction is performed with cD2, cD3, cA3 and the updated cD1, and the sequence after noise reduction is obtained.

Figure 8:
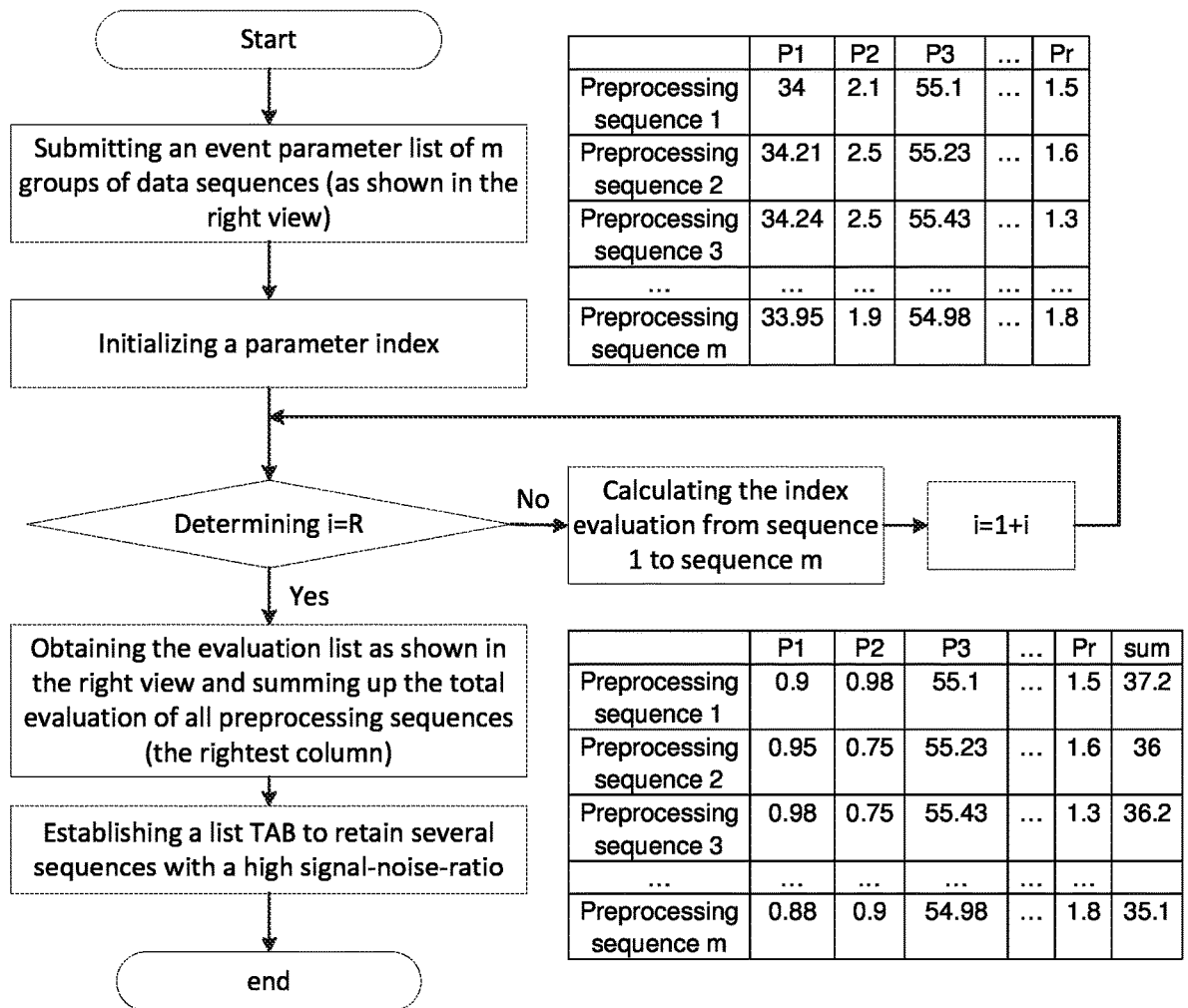
FIG. 8 is a flowchart of a preprocessing data decision device of the present disclosure.

The preprocessing data decision device is described by way of example in FIG. 8. Firstly, an event parameter list of M groups of data sequences is submitted. As shown in the FIG. 8, P1 indicates a location where event 1 occurred, P2 indicates a joint attenuation value of event 1. A total number of event parameters is set as r. Since the tested object is stable during the conventional testing process, r parameter lists may be obtained for all M groups of preprocessing sequences. For the same parameter measurement, the test results are considered to converge according to a large probability, and some individual abnormal test results are considered to be interfered by nonstationary noise, therefore, by exhausting the parameter index values, evaluation values of all parameters from P1 to Pr can be obtained. For an i-th parameter of a preprocessing sequence j, Pij indicates the value of the i-th parameter of the preprocessing sequence j, abs function is taken as the calculation for absolute value, aver is taken as the calculation for the arithmetic average, averPi indicates the arithmetic average of all m groups of sequences of the i-th parameter, stdPi is a standard quantity for accuracy measurement of the i-th parameter, which is usually an index parameter of OTDR or a linear function of the index parameter, for example, if the measurement accuracy of joint attenuation is limited as 0.3 db, then the standard quantity of accuracy measurement may be defined as 50%×0.3 dB, thus the index evaluation function is determined as follows:

$$EVLij = \begin{cases} \frac{abs(Pij - averPi)}{stdPi} & \text{if } (abs(Pij - averPi)/stdPi) < 1 \\ 1 & \text{else} \end{cases}.$$

Then, an evaluation table is obtained, as shown in a right view, and a summary calculation is carried out for the evaluation of all preprocessing sequences and shown in the rightmost column of the table, and the calculation method thereof is to obtain the sum of all the evaluation values of 1 to r event parameters of the preprocessing sequence j. An overall evaluation function is:

abs(EVLj−averEVL)<r*ratio, where EVLj indicates the overall evaluation of the j-th sequence, averEVL indicates the average value of the overall evaluation of all m sets of sequences, and * is taken as multiplication calculation, In general, ratio indicates an average deviation rate, for example, a common value is typically selected to be a number of about 0.2. In the M sequences, any sequence with an evaluation function of 1 indicates a sequence with high signal-to-noise ratio, and should be retained.

So far, the working process of the decision device is completed. Although the present disclosure has shown and described a related specific embodiment reference in detail, those skilled in the art should understand that various changes in form and details may be made without departing from the spirit and scope of the present disclosure. These changes will fall within the protection scope claimed by the claims of the present disclosure.

What is claimed is:

1. A signal processing system applied to remove OTDR noise characterized in comprising an analog-to-digital converter, a laser and driving unit, a sequence accumulator, a preprocessing counter, a pulse generator, a dual-port memory, an adaptive filter, an event decision device, and a preprocessing data decision device;

wherein the pulse generator includes a digital circuit for generating an electric pulse which corresponds to an optical pulse required by an OTDR measurement, q electric pulses being generated during one OTDR measurement;

wherein the laser and driving unit are used to convert the electric pulse generated by the pulse generator into an optical pulse signal without distortion;

wherein the analog-to-digital converter is used to convert an analog electrical signal indicating an OTDR test result into a digital signal forming a measurement sequence SERi which indicates a measurement sequence SER obtained from an i-th optical pulse;

wherein the sequence accumulator is used to accumulate and preprocess every n received measurement sequences SER to obtain a group of preprocessing data, thus m groups of preprocessing data are obtained during one OTDR measurement, m*n=q;

wherein one port of the dual-port memory is a write-only port which is connected to the sequence accumulator to read each group of preprocessing data obtained by the sequence accumulator, and the other port of the dual-port memory is a read-only port which is used to take data away for subsequent noise processing;

wherein the preprocessing counter is used to count a number of groups of preprocessing data obtained by the sequence accumulator, and generating an interrupt signal at obtaining a group of preprocessing data each time to notify the adaptive filter to read a new group of preprocessing data from the read-only port of the dual-port memory;

wherein the adaptive filter reads the preprocessing data from the read-only port of the dual-port memory, and performs noise processing on the read preprocessing data by using an adaptive filtering process of wavelet transform;

wherein the event decision device performs an event decision on filtered data output from the adaptive filter;

wherein the preprocessing data decision device decides whether a certain group of preprocessing data of the m groups of preprocessing data is correct data or high signal-to-noise data according to a difference of the m groups of preprocessing data after passing through the event decision device.

2. The signal processing system applied to remove OTDR noise of claim 1, wherein the sequence accumulator further performs an arithmetic average calculation after accumulating every n measurement sequences SER.

3. The signal processing system applied to remove OTDR noise of claim 1, wherein the adaptive filter performs a wavelet decomposition to an original signal X into sequences cD1, cD2, cD3, cA3 by using a multi-resolution frame, where cD1 indicates a highest frequency portion, cA3 indicates a lowest frequency portion; then, the adaptive filter takes an absolute value of the sequence of cD1 to obtain a sequence abs (cD1) and sorts the same; the adaptive filter limits a noise recovery threshold as a minimum value in largest beta values of the sorted sequence, and set a number of absolute value in cD1 that is greater than the noise recovery threshold as a noise average value; finally, the adaptive filter performs a wavelet reconstruction with cD2, cD3, cA3 and the updated cD1 to obtain a signal sequence after noise reduction.

4. The signal processing system applied to remove OTDR noise of claim 1, wherein the preprocessing data decision device adopts an index evaluation function $$EVLij = \begin{cases} \frac{abs(Pij - averPi)}{stdPi} & \text{if } (abs(Pij - averPi)/stdPi) < 1 \\ 1 & \text{else} \end{cases}$$

where $EVL_{ij}$ indicates evaluation of an i-th parameter of a preprocessing sequence j, Pij indicates a value of the i-th parameter of the preprocessing sequence j, abs function indicates a calculation for absolute value, aver indicates a calculation for arithmetic average, averPi indicates an arithmetic average of the i-th parameter in all m groups of sequences, and stdPi is a standard quantity of accuracy measurement of the i-th parameter;

and an overall evaluation function abs(EVLj−averEVL)<r*ratio where * is a multiplication calculation, ratio indicates an average deviation rate, EVLj is used to indicate overall evaluation of the j-th sequence, and averEVL is used to indicate an average value of the overall evaluation of all M groups of sequences;

to calculate a sum of all evaluation values of 1 to r event parameters of the preprocessing sequence j, wherein in m sequences, if the evaluation function of a sequence obtained by the calculation is 1, then sequence represents a sequence with high signal-to-noise ratio.

5. The signal processing system applied to remove OTDR noise of claim 1, wherein the pulse generator, the sequence accumulator, the preprocessing counter, and the dual-port memory are implemented by a PLD device.

6. The signal processing system applied to remove OTDR noise of claim 1, wherein the adaptive filter, the event decision device, and the preprocessing data decision device are implemented by a DSP and/or CPU.

7. The signal processing system applied to remove OTDR noise of claim 5, wherein the PLD device is an FPGA or CPLD.

8. The signal processing system applied to remove OTDR noise of claim 2, wherein the adaptive filter performs a wavelet decomposition to an original signal X into sequences cD1, cD2, cD3, cA3 by using a multi-resolution frame, where cD1 indicates a highest frequency portion, cA3 indicates a lowest frequency portion; then, the adaptive filter takes an absolute value of the sequence of cD1 to obtain a sequence abs (cD1) and sorts the same; the adaptive filter limits a noise recovery threshold as a minimum value in largest beta values of the sorted sequence, and set a number of absolute value in cD1 that is greater than the noise recovery threshold as a noise average value; finally, the adaptive filter performs a wavelet reconstruction with cD2, cD3, cA3 and the updated cD1 to obtain a signal sequence after noise reduction.

9. The signal processing system applied to remove OTDR noise of claim 2, wherein the preprocessing data decision device adopts an index evaluation function $$EVLij = \begin{cases} \frac{abs(Pij - averPi)}{stdPi} & \text{if } (abs(Pij - averPi)/stdPi) < 1 \\ 1 & \text{else} \end{cases}$$

where $EVL_{ij}$ indicates evaluation of an i-th parameter of a preprocessing sequence j, Pij indicates a value of the i-th parameter of the preprocessing sequence j, abs function indicates a calculation for absolute value, aver indicates a calculation for arithmetic average, averPi indicates an arithmetic average of the i-th parameter in all m groups of sequences, and stdPi is a standard quantity of accuracy measurement of the i-th parameter;

and an overall evaluation function abs (EVLj−averEVL)<r*ratio where * is a multiplication calculation, ratio indicates an average deviation rate, EVLj is used to indicate overall evaluation of the j-th sequence, and averEVL is used to indicate an average value of the overall evaluation of all M groups of sequences;

to calculate a sum of all evaluation values of 1 to r event parameters of the preprocessing sequence j, wherein in m sequences, if the evaluation function of a sequence obtained by the calculation is 1, then sequence represents a sequence with high signal-to-noise ratio.

10. The signal processing system applied to remove OTDR noise of claim 3, wherein the preprocessing data decision device adopts an index evaluation function $$EVLij = \begin{cases} \frac{abs(Pij - averPi)}{stdPi} & \text{if } (abs(Pij - averPi)/stdPi) < 1 \\ 1 & \text{else} \end{cases}$$

where $EVL_{ij}$ indicates evaluation of an i-th parameter of a preprocessing sequence j, Pij indicates a value of the i-th parameter of the preprocessing sequence j, abs function indicates a calculation for absolute value, aver indicates a calculation for arithmetic average, averPi indicates an arithmetic average of the i-th parameter in all m groups of sequences, and stdPi is a standard quantity of accuracy measurement of the i-th parameter;

and an overall evaluation function abs (EVLj−averEVL)<r*ratio where * is a multiplication calculation, ratio indicates an average deviation rate, EVLj is used to indicate overall evaluation of the j-th sequence, and averEVL is used to indicate an average value of the overall evaluation of all M groups of sequences;

to calculate a sum of all evaluation values of 1 to r event parameters of the preprocessing sequence j, wherein in m sequences, if the evaluation function of a sequence obtained by the calculation is 1, then sequence represents a sequence with high signal-to-noise ratio.

11. The signal processing system applied to remove OTDR noise of claim 2, wherein the pulse generator, the sequence accumulator, the preprocessing counter, and the dual-port memory are implemented by a PLD device.

12. The signal processing system applied to remove OTDR noise of claim 3, wherein the pulse generator, the sequence accumulator, the preprocessing counter, and the dual-port memory are implemented by a PLD device.

13. The signal processing system applied to remove OTDR noise of claim 4, wherein the pulse generator, the sequence accumulator, the preprocessing counter, and the dual-port memory are implemented by a PLD device.

14. The signal processing system applied to remove OTDR noise of claim 2, wherein the adaptive filter, the event decision device, and the preprocessing data decision device are implemented by a DSP and/or CPU.

15. The signal processing system applied to remove OTDR noise of claim 3, wherein the adaptive filter, the event decision device, and the preprocessing data decision device are implemented by a DSP and/or CPU.

16. The signal processing system applied to remove OTDR noise of claim 4, wherein the adaptive filter, the event decision device, and the preprocessing data decision device are implemented by a DSP and/or CPU.

17. The signal processing system applied to remove OTDR noise of claim 5, wherein the adaptive filter, the event decision device, and the preprocessing data decision device are implemented by a DSP and/or CPU.

* * * * *